(12) United States Patent
Memarzadeh et al.

(10) Patent No.: US 7,265,682 B2
(45) Date of Patent: Sep. 4, 2007

(54) JOINT SOURCE-CHANNEL CODING FOR MULTICARRIER MODULATION

(75) Inventors: Mahsa Memarzadeh, Houston, TX (US); Wallace R. Gardner, Houston, TX (US); Don Herrick Johnson, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 185 days.

(21) Appl. No.: 11/093,120

(22) Filed: Mar. 29, 2005

(65) Prior Publication Data

US 2006/0055556 A1    Mar. 16, 2006

Related U.S. Application Data (60) Provisional application No. 60/610,131, filed on Sep. 15, 2004.

(51) Int. Cl.
*G08C 19/16*    (2006.01)

(52) U.S. Cl. .................... 340/870.18; 340/870.17; 340/870.19; 340/854.4; 340/870.07; 367/81; 367/82

(58) Field of Classification Search ........... 340/870.18, 340/870.17, 870.19, 855.4, 870.07; 367/81; 725/111
See application file for complete search history.

(56) References Cited

U.S. PATENT DOCUMENTS

| 4,293,936 A | 10/1981 | Cox et al. |
| 5,903,608 A | 5/1999 | Chun |
| 2003/0015319 A1 | 1/2003 | Green et al. |
| 2004/0156264 A1 | 8/2004 | Gardner et al. |

OTHER PUBLICATIONS

PCT International Search Report for International Application No. PCT/US05/32709, mailing date: Mar. 30, 2006, 4 pages.
Zeeng, Haitao et al., "Robust Image And Video Transmission Over Spectrally Shaped Channels Using Multicarrier Modulation," IEEE Transaction on Multimedia, vol. 1, No. 1, Mar. 1999, pp. 88-103.
Bedrosian, Edward, "Weighted PCM," IEEE Transactions On Information Theory, vol. 44, No. 4, pp. 45-49, Mar. 1958.

(Continued)

*Primary Examiner*—Jeffery Hofsass
*Assistant Examiner*—Sisay Yacob
(74) *Attorney, Agent, or Firm*—Krueger Iselin LLP (57) ABSTRACT

Methods and systems employing combined source-channel coding for multi-carrier modulation (MCM). In some embodiments, a described method comprises: estimating channel gain to noise ratio (CGNR) as a function of frequency bin; determining MCM parameters that minimize distortion of one or more telemetry signals; generating a communications signal using the MCM parameters, and transmitting the communications signal via a communications channel. The MCM parameters may be determined by minimizing a telemetry signal distortion measure subject to CGNR and a transmit power constraint. The MCM parameters may further account for differing fidelity requirements when multiple telemetry signals are being transmitted.

15 Claims, 6 Drawing Sheets

OTHER PUBLICATIONS

Bingham, John A.C., "Multicarrier Modulation For Data Transmission: An Idea Whose Time Has Come," IEEE Communications Magazine, May 1990, pp. 5-14.

Campello, Jorge, "Optimal Discrete Bit Loading For Multicarrier Modulation Systems," IEEE Symp., Cambridge, MA., Aug. 16-21, 1988, p. 193.

Chow, Peter S., et al., "A Practical Discrete Multitone Transciver Loading Algorithm For Data Transmission Over Spectrally Shaped Channels," IEEE Transactions On Communications, vol. 43, No. 2/3/4, Feb.-Apr. 1995, pp. 773-775.

Ho, Keang-Po, et al., "Transmission Of Analog Signals Using Multicarrier Modulation: A Combined Source-Channel Coding Approach," IEEE Transactions On Communications, vol. 44, No. 11, Nov. 1996, pp. 1432-1443.

Johnson, Don H., et al., "Optimizing Physical Layer Data Transmission For Minimal Signal Distortion," Proceedings of IEEE International Conference on Acoustics, Speech, and Signal Processing, 2003, 4 pgs.

Krongold, Brian S., et al., "Computationally Efficient Optimal Power Allocation Algorithms For Multicarrier Communication Systems," IEEE Transactions On Communications, vol. 48, No. 1, 2000, pp. 23-27.

Sinanovic, Sinan, et al., "Data Communication Along The Drill String Using Acoustic Waves," Proceedings of IEEE International Conference on Acoustics, Speech, and Signal Processing, 2003, 4 pgs.

Zheng, Haitao, et al., "Robust Image And Video Transmission Over Spectraly Shaped Channels Using Multicarrier Modulation," IEEE Transactions On Multimedia, vol. 1, No. 1, Mar. 1999, pp. 88-103.

JOINT SOURCE-CHANNEL CODING FOR MULTICARRIER MODULATION

CROSS-REFERENCE TO RELATED APPLICATIONS

This application claims priority to Provisional U.S. Patent Application No. 60/610,131, entitled "Optimal Borehole Communications Using Multicarrier Modulation", filed Sep. 15, 2004, which is hereby incorporated herein by reference.

BACKGROUND

Modem petroleum drilling and production operations demand a great quantity of information relating to parameters and conditions downhole. Such information typically includes characteristics of the earth formations traversed by the wellbore, along with data relating to the size and configuration of the borehole itself. The collection of information relating to conditions downhole, which commonly is referred to as "logging", can be performed by several methods.

In conventional wireline logging, a probe or "sonde" that houses formation sensors is lowered into the borehole after some or all of the well has been drilled. As the sonde is retrieved from the borehole, it measures certain characteristics of the surrounding formations. The upper end of the sonde is attached to a conductive wireline that suspends the sonde in the borehole. Power is transmitted to the sensors and instrumentation in the sonde through the conductive wireline. Similarly, the instrumentation in the sonde communicates information to the surface by electrical signals transmitted through the wireline.

The problem with obtaining downhole measurements via wireline is that the drilling assembly must be removed or "tripped" from the drilled borehole before the desired borehole information can be obtained. This can be both time-consuming and extremely costly, especially in situations where a substantial portion of the well has been drilled. In this situation, thousands of feet of tubing may need to be removed and stacked on the platform (if offshore). Typically, drilling rigs are rented by the day at a substantial cost. Consequently, the cost of drilling a well is directly proportional to the time required to complete the drilling process. Removing thousands of feet of tubing to insert a wireline logging tool can be an expensive proposition.

As a result, there has been an increased emphasis on the collection of data during the drilling process. Collecting and processing data during the drilling process eliminates the necessity of removing or tripping the drilling assembly to insert a wireline logging tool. It consequently allows the driller to make accurate modifications or corrections as needed to optimize performance while minimizing drilling time. Designs for measuring conditions downhole including the movement and location of the drilling assembly contemporaneously with the drilling of the well have come to be known as "measurement-while-drilling" techniques, or "MWD". Similar techniques, concentrating more on the measurement of formation parameters, commonly have been referred to as "logging while drilling" techniques, or "LWD". While distinctions between MWD and LWD may exist, the terms MWD and LWD often are used interchangeably. For the purposes of this disclosure, the term MWD will be used with the understanding that this term encompasses both the collection of formation parameters and the collection of information relating to the movement and position of the drilling assembly.

When oil wells or other boreholes are being drilled, it is frequently necessary or desirable to determine the direction and inclination of the drill bit and downhole motor so that the assembly can be steered in the correct direction. Additionally, information may be required concerning the nature of the strata being drilled, such as the formation's resistivity, porosity, density and its measure of gamma radiation. It is also frequently desirable to know other downhole parameters, such as the temperature and the pressure at the base of the borehole, for example. Once this data is gathered at the bottom of the borehole, it is necessary to communicate it to the surface for use and analysis by the driller.

In MWD systems, sensors or transducers are typically located at the lower end of the drill string. While drilling is in progress these sensors continuously or intermittently monitor predetermined drilling parameters and formation data and transmit the information to a surface detector by some form of telemetry. Typically, the downhole sensors employed in MWD applications are positioned in a cylindrical drill collar that is positioned close to the drill bit. The MWD system then employs a system of telemetry in which the data acquired by the sensors is transmitted to a receiver located on the surface. There are a number of telemetry systems in the prior art which seek to transmit information regarding downhole parameters up to the surface without requiring the use of a wireline tool. Of these, the mud pulse system is one of the most widely used telemetry systems for MWD applications.

The mud pulse telemetry system creates "acoustic" pressure signals in the drilling fluid that is circulated under pressure through the drill string during drilling operations. The information that is acquired by the downhole sensors is transmitted by suitably timing the formation of pressure pulses in the mud stream. The information is received and decoded by a pressure transducer and computer at the surface.

In a mud pressure pulse system, the drilling mud pressure in the drill string is modulated by means of a valve and control mechanism, generally termed a pulser or mud pulser. The pulser is usually mounted in a specially adapted drill collar positioned above the drill bit. The generated pressure pulse travels up the mud column inside the drill string at the velocity of sound in the mud. Depending on the type of drilling fluid used, the velocity may vary between approximately 3000 and 5000 feet per second. The rate of transmission of data, however, is relatively slow due to pulse spreading, distortion, attenuation, modulation rate limitations, and other disruptive forces, such as the ambient noise in the drill string. A typical pulse rate is typically less than 10 pulses per second (10 Hz).

Given the recent developments in sensing and steering technologies available to the driller, the amount of data that can be conveyed to the surface in a timely manner is sorely inadequate. As one method for increasing the rate of transmission of data, it has been proposed to transmit the data using compressional acoustic waves in the tubing wall of the drill string rather than depending on pressure pulses in the drilling fluid. Many physical constraints present challenges for this type of telemetry. Acoustic wave propagation through the drill string encounters attenuation and scattering due to the acoustic impedance mismatch at pipe joints. The resulting transfer function is lossy and has alternating stop and uneven pass bands. In-band noise produced by the bit and surface motor produces a low signal-to-noise ratio. Moreover, the downhole transmitter has significant power constraints. Therefore, it would be desirable to provide a communication technique that improves the performance of acoustic telemetry in the face of the above obstacles.

SUMMARY

Accordingly, there is disclosed herein methods and systems employing combined source-channel coding for multi-carrier modulation (MCM). In some embodiments, a described method comprises: estimating channel gain to noise ratio (CGNR) as a function of frequency bin; determining MCM parameters that minimize distortion of one or more telemetry signals; generating a communications signal using the MCM parameters, and transmitting the communications signal via a communications channel. The MCM parameters may be determined by minimizing a telemetry signal distortion measure subject to CGNR and a transmit power constraint. The MCM parameters may further account for differing fidelity requirements when multiple telemetry signals are being transmitted.

In other contemplated embodiments, a described telemetry transmitter comprises a source compressor, an allocation module and a transform module. The source compressor optimally selects the source bits that have to be communicated for minimal distortion. The allocation module maps those bits from one or more telemetry signals to a set of channel frequency bins, thereby generating a set of frequency coefficient. It also optimally partitions the available power among those frequency bins The transform module converts the set of frequency coefficients into a corresponding time-domain signal. The mapping performed by the allocation module causes the most influential bits to be mapped to the bins having the highest CGNRs.

In still other contemplated embodiments, a described downhole telemetry system comprises a transmitter, a tubular string, and a receiver. The transmitter employs combined source-channel coding to generate an acoustic signal that represents at least one analog telemetry signal. The tubular string transports the acoustic signal from the transmitter to the receiver. The receiver converts the acoustic signal into a representation of at least one analog telemetry signal.

BRIEF DESCRIPTION OF THE DRAWINGS

A better understanding of the disclosed embodiments can be obtained when the following detailed description is considered in conjunction with the following drawings, in which:

FIG. 9 shows a flowchart of an illustrative method for optimizing system performance While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 1:
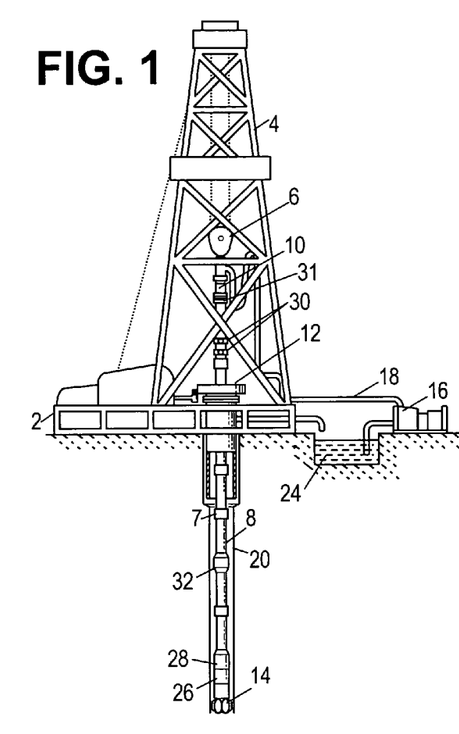
FIG. 1 is an environmental view of an oil well in which an acoustic telemetry system may be employed.

Turning now to the figures, FIG. 1 shows a well during drilling operations. A drilling platform 2 is equipped with a derrick 4 that supports a hoist 6. Drilling of oil and gas wells is carried out by a string of drill pipes connected together by "tool" joints 7 so as to form a drill string 8. The hoist 6 suspends a kelly 10 that is used to lower the drill string 8 through rotary table 12. Connected to the lower end of the drill string 8 is a drill bit 14. The bit 14 is rotated and drilling accomplished by rotating the drill string 8, by use of a downhole motor near the drill bit, or by both methods. Drilling fluid, termed "mud", is pumped by mud recirculation equipment 16 through supply pipe 18, through drilling kelly 10, and down through the drill string 8 at high pressures and volumes to emerge through nozzles or jets in the drill bit 14. The mud then travels back up the hole via the annulus formed between the exterior of the drill string 8 and the borehole wall 20, through a blowout preventer (not specifically shown), and into a mud pit 24 on the surface. On the surface, the drilling mud is cleaned and then recirculated by recirculation equipment 16. The drilling mud is used to cool the drill bit 14, to carry cuttings from the base of the bore to the surface, and to balance the hydrostatic pressure in the rock formations.

Downhole sensors 26 are coupled to an acoustic telemetry transmitter 28 that transmits telemetry signals in the form of acoustic vibrations in the tubing wall of drill string 8. An acoustic telemetry receiver array 30 may be coupled to the kelly 10 to receive transmitted telemetry signals. A surface acoustic transmitter 31 may be provided for transmitting commands in the opposite direction. One or more repeater modules 32 may be provided along the drill string to receive and retransmit the telemetry signals. The repeater modules 32 include both an acoustic telemetry receiver array and an acoustic telemetry transmitter configured similarly to receiver array 30 and the transmitter 28.

Figure 2A:
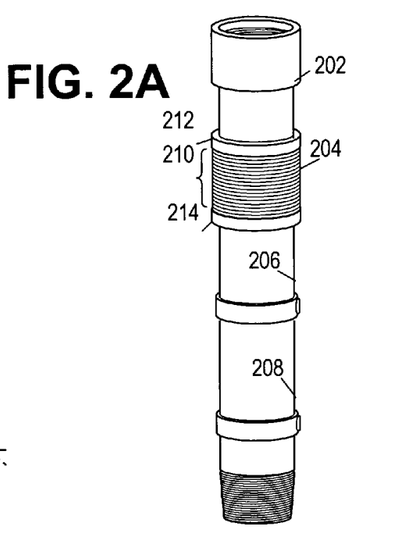
FIG. 2A is a view of an illustrative surface acoustic transceiver.

FIG. 2A shows an illustrative surface acoustic transceiver mounted on a drill string 202. The surface transceiver includes an acoustic transmitter 204 and one or more acoustic sensors 206, 208, spaced apart along the axis of the drill string 202. The illustrated acoustic transmitter comprises a piezoelectric stack 210 has a stack of piezoelectric washers 210 sandwiched between two metal flanges 212, 214. When the stack of piezoelectric washers 210 is driven electrically, the stack expands and contracts to produce axial compression waves that propagate axially along the drill string. Other transmitter configurations may be used to produce torsional waves, radial compression waves, or even transverse waves that propagate along the drill string. Various suitable acoustic transmitters are known in the art, as evidenced by U.S. Pat. Nos. 2,810,546, 3,588,804, 3,790,930, 3,813,656, 4,282,588, 4,283,779, 4,302,826, and 4,314,365.

Various suitable acoustic sensors 206, 208 are known in the art including pressure, velocity, and acceleration sensors. Sensors 206 and 208 may comprise two-axis accelerometers that sense accelerations along the axial and circumferential directions. One skilled in the art will readily recognize that other sensor configurations are also possible. As just one example, sensors 206 and 208 may comprise three-axis accelerometers that also detect acceleration in the radial direction.

Additional sensors may be provided 90 or 180 degrees away from the sensors shown. A reason for employing such additional sensors stems from an improved ability to isolate and detect a single acoustic wave propagation mode to the exclusion of other propagation modes. Thus, for example, a multi-sensor configuration may exhibit improved detection of axial compression waves to the exclusion of torsional waves, and conversely, may exhibit improved detection of torsional waves to the exclusion of axial compression waves. U.S. Pat. No. 6,370,082 entitled "Acoustic Telemetry System With Drilling Noise Cancellation" discusses one such sensor configuration.

Additional sensors may be spaced axially along the drill string 202. One reason for employing multiple, axially spaced sensors stems from an enhanced ability to screen out downlink signals and surface noise, thereby improving the signal to noise ratio of the uplink receive signal. Larger axial spacings within physical system constraints may be preferred.

Figure 2B:
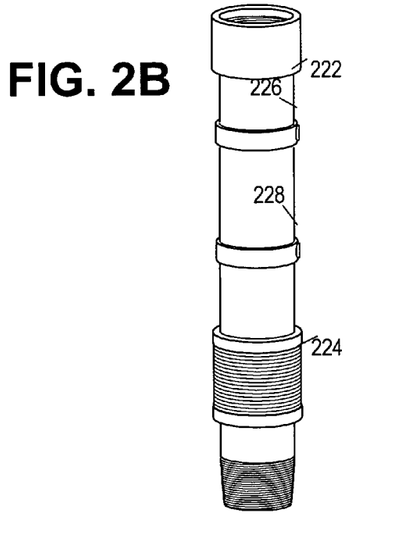
FIG. 2B is a view of an illustrative downhole acoustic transceiver.

FIG. 2B shows an illustrative downhole acoustic transceiver 222. Transceiver 222 includes a transmitter 224 and sensors 226, 228. The sensors 226, 228 are positioned between the transmitter 224 and the surface transceiver to allow the downhole transceiver to differentiate downlink signal energy from uplink signal energy based on their respective propagation directions. The downhole transceiver 222 may employ array processing techniques as described in U.S. patent application Ser. No. 10/897,559 (Filed Jul. 23, 2004) to improve signal-to-noise ratio in this manner.

Figure 3:
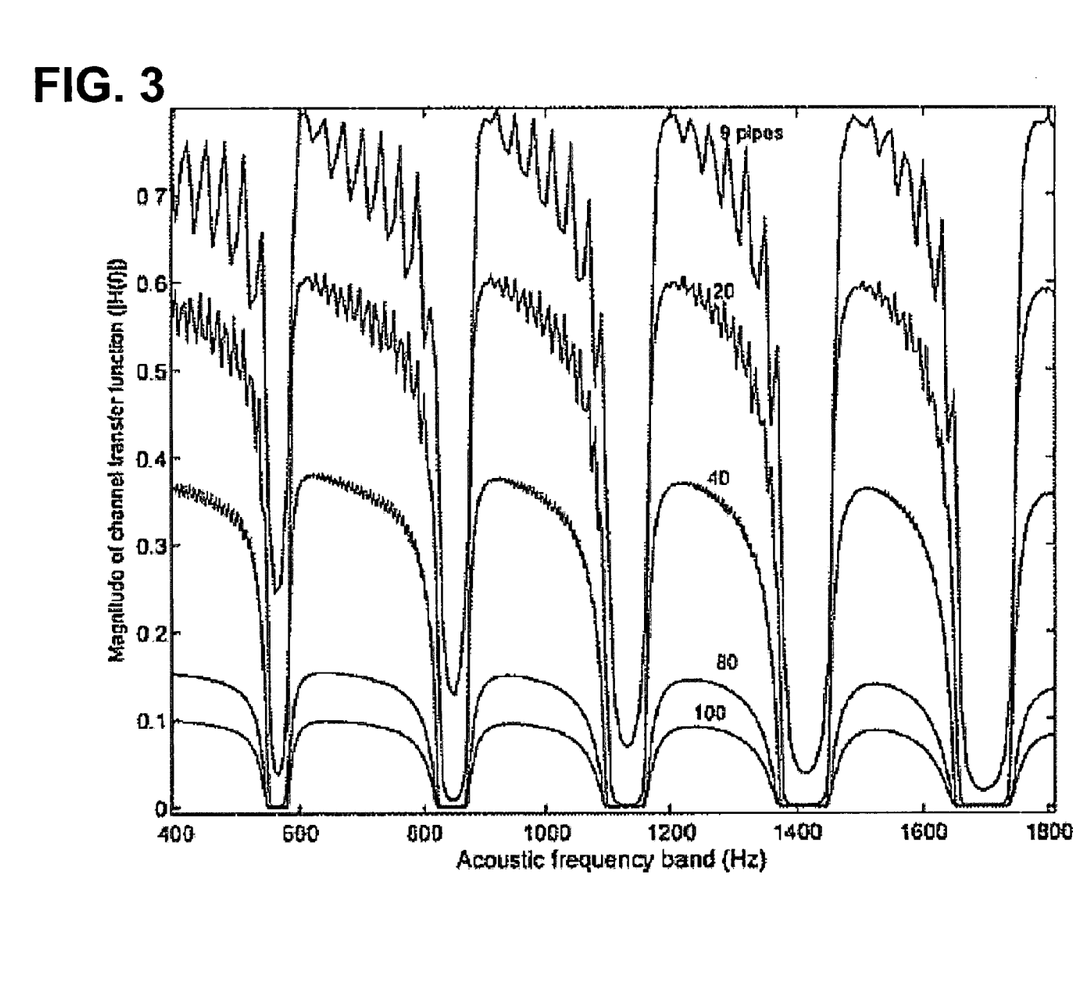
FIG. 3 is a graph of a channel transfer function for different drill string lengths.

The drill string 8 is a steel tube having a periodic structure. The pipes are interspersed with tool joints 7 that have a cross-sectional area several times that of the main pipe body. The change in cross-sectional area causes the acoustic impedance to vary, which in turn causes propagating acoustic waves to reflect. The periodic acoustic impedance changes cause numerous reflections and re-reflections of acoustic signal energy as it propagates along the drill string. The channel impulse response consequently extends over a relatively lengthy interval, causing severe inter-symbol interference. FIG. 3 shows illustrative channel response magnitudes as a function of frequency. Spectral analysis of the channel reveals a comb-like transfer function composed of alternating stop bands and uneven pass bands.

Figure 4:
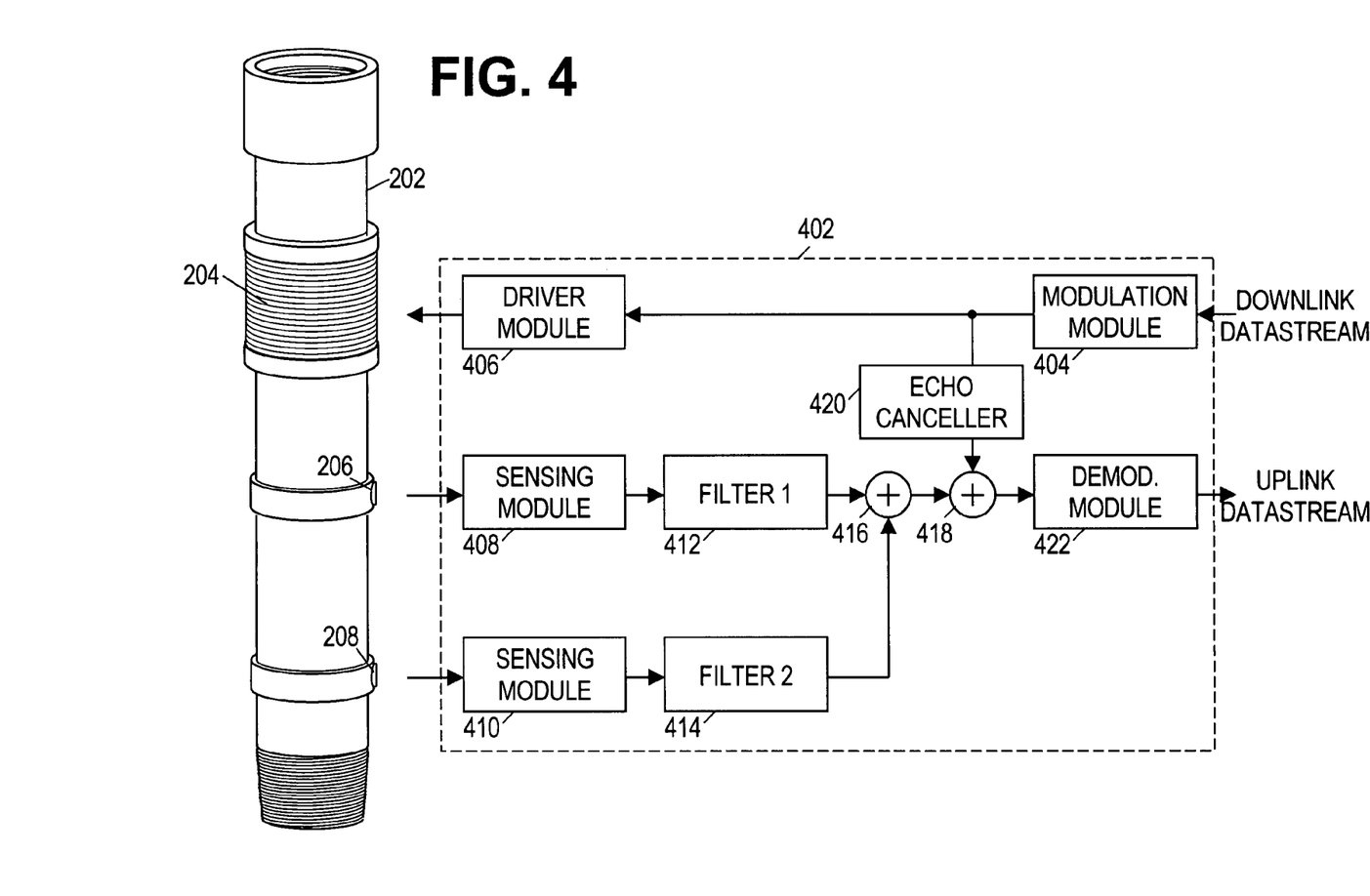
FIG. 4 is a block diagram of an illustrative transceiver configuration.

FIG. 4 shows a block diagram of an illustrative surface transceiver 202. (The downhole transceiver is similar.) The transceiver electronics 402 include a modulation module 404 that converts a downlink data stream into a transmit signal. A driver module 406 converts the transmit signal to an analog signal, amplifies it, and applies it to acoustic transmitter 204. The acoustic transmitter 204 converts the transmit signal into an acoustic downlink signal that propagates along the drill string.

Sensing modules 408 and 410 receive signals from acoustic sensors 206 and 208. The sensing modules filter the sensor signals and convert them to digital sensor signals. Filters 412 and 414 may be designed to filter the digital sensor signals so that, when adder 416 combines the filtered signals, any downward-propagating acoustic energy is suppressed. A second adder 418 may remove any residual interference from the acoustic downlink signal. An echo-canceling filter 420 converts the transmit signal into and estimate of the residual interference and provides the estimate to adder 418. The resulting receive signal is converted into an uplink data stream by demodulation module 422.

Figure 5:
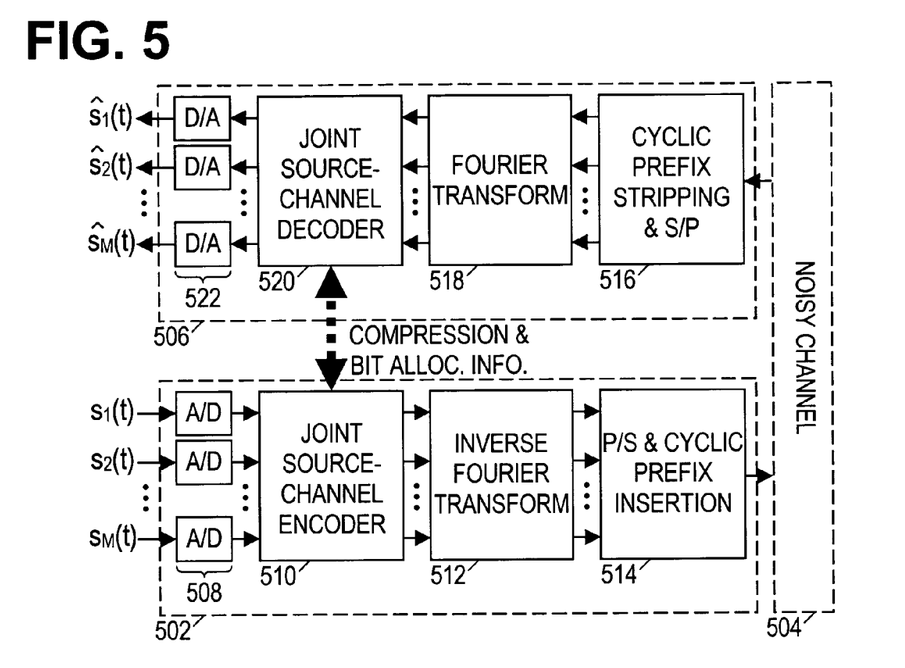
FIG. 5 is an illustrative model of an optimal multi-carrier modulation (MCM) communication system.

FIG. 5 shows an uplink communications model in which a downhole transmitter 502 receives one or more input signals $s_m(t)$, m=1, . . . ,M, and modulates them for transmission on a noisy channel 504. The noisy channel 504 represents the overall effect of the acoustic transmitter, the drill string (which experiences vibrations from surface noise and drilling noise), and the acoustic sensors. A surface receiver 506 receives the channel output and demodulates it to obtain estimated signals $\hat{s}_m(t)$.

As depicted in the system model, M streams of independent telemetry measurements are individually sampled and quantized into $B_m$, m=1, . . . ,M bits by each sensor's analog to digital converter (ADC) 508. Telemetry signals differ in what they measure and in their communication fidelity requirements. The fidelity requirement of each input signal may be determined by its relative contribution to the efficiency of drilling and extraction operations. The more influential measurements may be required to have higher fidelities. Fidelity requirements will impact the number of quantization bits and the channel error rates that the signal can tolerate. Moreover, since the telemetry signals may be very different, it may be expected that joint compression gains would be negligible. Accordingly, in the model transmitter, a set of analog to digital converters (ADCs) 508 individually samples the input signals and quantizes them into $K_m$, m=1, . . . ,M, bits each.

A joint souce-channel coding encoder module 510 optimally compresses each signal's output ADC bits by selecting only those bits that have to be communicated for minimal distortion. Module 510 also optimally maps the selected bits into frequency bins and further applies a gain factor for each bit by optimally apportioning the available power among the bits. The operation may be performed in a manner designed to minimize the aggregate mean-squared error (MSE) distortion of the reconstructed telemetry signals $\hat{s}_m(t)$ at the receiver. (The optimal allocation methods are explained and described further below.) The output of module 510 is a set of frequency coefficients that specify amplitudes associated with evenly-distributed frequency components. An inverse Fourier Transform module 512 accepts the set of frequency coefficients and transforms the set into a time-domain signal (sometimes called a "symbol") having the specified frequency components. A parallel-to-serial module 514 adds a cyclic prefix to the time domain signal and converts the time domain signal into a sample sequence that gets transmitted via channel 504.

Cyclic prefixing is a cyclic extension of a symbol by some number of time-domain samples from the end of a symbol. That is, the cyclic prefix is a duplication of some number of samples from the end of a symbol, which are prepended to the symbol to reduce interference. The cyclic prefix is stripped from the symbol by the receiver, but its effects on the symbol remain, causing the channel convolution to appear like a cyclic convolution. The use of a cyclic prefix allows for use of very efficient equalization in the frequency domain.

In the receiver 506, a serial-to-parallel module 516 converts the sequence of channel output samples into a sequence of multi-sample symbols, dropping the cyclic prefix in the process. A Fourier Transform module 518 transforms each symbol into a set of frequency coefficients. If desired, frequency domain equalization may be performed at this stage. A joint source-channel coding (JSCC) decoder module 520 reverses the encoder operation by extracting signal bits from the set of frequency coefficients and reassembling the bits to reconstruct the digital signal estimates. Information about the allocation of bits to frequency bins and the compression performed at the transmitter side is used by the receiver for signal reconstruction. A set of digital-to-analog converters (DACs) 522 may be provided to convert the digital signal estimates into analog signal estimates.

In the transmitter, modules 510, 512, and 514 may be implemented as application specific integrated circuits (ASICs), or they may be implemented as software modules running on a processor chip. Similarly in the receiver, modules 516, 518 and 520 may be implemented as ASICs or as software modules running on a processor chip. Both the transmitter and receiver will include control modules that are not specifically shown here, but which could similarly be implemented in hardware of software. The control modules may coordinate the characterization of the channel and the communication of gain and bit allocation information between the two ends of the channel.

The foregoing model serves as a basis for deriving optimal bit and gain allocation methods. Modeling the fidelity requirements of the streams by weighting coefficients $\alpha_m$, m=1, . . . ,M, the overall mean-squared error distortion resulting from digital communication of multiple streams of analog telemetry signals can be expressed as:

$$D = \sum_{m=1}^{M} \alpha_m \left( E[(s_m - \hat{s}_m)^2] + \frac{2^{-2K_m}}{12} \right), \quad (1)$$

where $s_m$ and $\hat{s}_m$ are, respectively, the original and recovered amplitudes for the mth signal stream, and $K_m$ is the transmitted number of bits used to represent the mth signal stream. (Without loss of generality, we assume that the signal amplitudes $s_m$ are normalized to the range [0,1]. Therefore, $$s_m = \sum_{k_m=1}^{K_m} b_{k_m}^{(s_m)} 2^{-k_m}, \quad (2)$$

where $b_{k_m}^{(s_m)}$ is the $k_m$th bit in the sequence. Substituting from equation (2) into equation (1), we have $$D = \sum_{m=1}^{M} \alpha_m \left( E\left[ \left( \sum_{k_m=1}^{K_m} (b_{k_m}^{(s_m)} - b_{k_m}^{(\hat{s}_m)}) 2^{-k_m} \right)^2 \right] + \frac{2^{-2K_m}}{12} \right) \quad (3)$$

$$D = \sum_{m=1}^{M} \alpha_m \left( E\left[ \sum_{k_m=1}^{K_m} \sum_{l_m=1}^{K_m} (b_{k_m}^{(s_m)} - b_{k_m}^{(\hat{s}_m)}) (b_{l_m}^{(s_m)} - b_{l_m}^{(\hat{s}_m)}) 2^{-(k_m+l_m)} \right] + \frac{2^{-2K_m}}{12} \right). \quad (4)$$

The cross terms within the square brackets account for possible correlations among bit error events.

To simplify the equation, we consider a design technique that results in independent bit error events (zero correlation). In such a case, the cross terms would result in zero expected value and the only non-zero terms are those with $k_m = l_m$. Equation (4) then reduces to $$D = \sum_{m=1}^{M} \alpha_m \left( \sum_{k_m=1}^{K_m} 2^{-k_m} p_e(P_{k_m}^{(m)}) + \frac{2^{-2K_m}}{12} \right), \quad (5)$$

where $p_e(P_{k_m}^{(m)})$ is the bit error probability of the $k_m$ bit in the bit sequence of signal $s_m(t)$ with $P_{k_m}^{(m)}$ representing the power used to send it. The optimal joint source-channel coding is therefore mathematically formulated by an optimization problem in which (5) is minimized subject to the following constraints $$\sum_{m=1}^{M} \sum_{k_m=1}^{K_m} P_{k_m}^{(m)} = P_t, \quad (6)$$

$$P_{k_m}^{(m)} \geq 0, \forall m, k_m \quad (7)$$

$$K_m \leq B_m, \forall m \quad (8)$$

where $P_t$ is the total power constraint and (8) takes the maximum available number of quantization bits per signal, $B_m$, into account. Therefore, a total of $$\sum_{m=1}^{M} K_m \leq \sum_{m=1}^{M} B_m$$

bits will be optimally selected for transmission and this would determine the optimal compression on the source data bits.

An optimal design based on the above optimization technique results in unequal protection for bits of different importance. Increasing the number of bits used to represent a given analog stream has an exponentially decreasing effect on reducing the mean-squared error. Consequently, the additional power used to send relatively unimportant bits from one stream might be better used to send another signal's bits or to improve the bit error probability of a more important bit. A significant improvement in system performance can be realized by jointly optimizing the number of quantization bits for each signal while simultaneously optimizing the channel error rates.

To preserve the independent bit error probability assumption, the following analysis assumes uncoded data modulated using binary phase-shift keying (BPSK) and four-point quadrature amplitude modulation (4-QAM). Nevertheless, the analysis results are expected to be directly applicable to systems where bit error probabilities are substantially uncorrelated, and to be approximately optimal even for those systems where the error probabilities are correlated.

In MCM signaling with a BPSK constellation, module 510 assigns one bit to each frequency bin. Therefore, a maximum of N most important bits (out of the total sum $$\sum_{m=1}^{M} B_m$$

from all signals) can potentially be transmitted by this scheme, where N denotes the total number of frequency bins. The channel gain to noise ratio (CGNR) for the uplink signal may be defined as $$G(f) = \frac{|H(f)|^2}{N_b(f)|H(f)|^2 + N_S(f)}, \qquad (9)$$

where H(f) is the transfer function of the drill string, $N_b(f)$ is the bit noise spectrum, and $N_s(f)$ is surface noise spectrum. (For the downlink signal CGNR, the spectra of the bit noise and the surface noise should be switched.) Let $G_n$ represent $G(f_n)$, where $f_n$ is the center frequency of the nth frequency bin, and let $P_n$ represent the transmit power allocated to the nth frequency bin. The probability of bit error is then expressible as $$p_e^{(n)} = Q(\sqrt{P_n G_n}), \qquad (10)$$

where Q(x) is the well-known complementary error function representing the integrated area under the tail of a Gaussian curve:

$$Q(x) = \frac{1}{\sqrt{2\pi}} \int_x^\infty e^{-u^2/2} du, \qquad (11)$$

From the foregoing, the JSCC optimization problem from equation (6) can be expressed:

$$\min_{P_{n,m} \geq 0} D_{bpsk} = \sum_{n=1}^{N} \omega_n Q\left(\sqrt{\sum_{m=1}^{N} P_{n,m} G_m}\right) \qquad (12)$$

$$\text{subject to } \sum_{n=1}^{N} \sum_{m=1}^{N} P_{n,m} = P_t,$$

where $P_{n,m}$ is the power allocated to the nth bit transmitted in the mth bin, and $P_t$ is the limit on total transmit power. Here we have assumed that $\omega_n$ represents the overall bit weight ($\alpha_n 2^{-2k_m}$) for the $n^{th}$ bit. The receiver will coherently combine bin measurements when two or more bins are used to send the same bit. Thus the total energy for each bit is summed over all contributing bins.

It can be shown that for a spectrally shaped channel, distributing the energy for a BPSK bit over more than one frequency bin is suboptimal. Thus, in order to make the best use of the N available frequency bins, N bits should be sent, thereby maximizing the number of description bits for the analog input signals. The optimization problem of (11) therefore reduces to a bit and gain allocation problem. For each possible assignment of bits to bins, the power optimization may be solved. The assignment giving the minimum distortion under the optimal power allocation is then the optimal allocation strategy.

Fortunately, the authors have determined that the optimization can be performed in two independent stages. In the first stage, the bit assignment problem is determined, and in the second stage the power allocation is found.

The bit assignment determination proceeds as follows. First, sort the N most important bits in order of decreasing weight ($\alpha_x 2^{-2k_m}$). Second, sort the frequency bins in order of decreasing CGNR. Finally, assign the first (most heavily weighted) bit to the first (highest CGNR) bin, assign the second bit to the second bin, the third bit to the third bin, and so on until the least weighted bit is assigned to the bin with the lowest gain.

The optimal power allocation can then be found by solving the optimization problem $$\min_{P_n \geq 0} D_{bpsk} = \sum_{n=1}^{N} \omega_n Q\left(\sqrt{P_n G_n}\right) \qquad (13)$$

$$\text{subject to } \sum_{n=1}^{N} P_n = P_t.$$

This optimization problem is a convex optimization problem, which means a unique power allocation minimizes the distortion. The allocation can be found using standard convex optimization tools.

Figure 7:
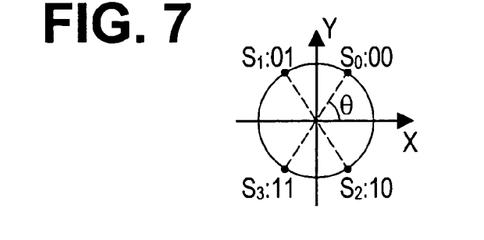
FIG. 7 is an illustrative constellation diagram.

In MCM signaling with a 4-QAM constellation, module 510 assigns two bits to each frequency bin. The total number of bits is therefore 2N. The assignment of bits to frequency bins is handled in the same manner as BPSK (i.e, by sorting the bits by weight, the bins by CGNR, and mapping most important bits to bins with highest CGNRs), except that two bits are allocated to each bin. The additional bits should allow distortion to be reduced, and should allow for better utilization of the bins having higher CGNRs. FIG. 7 shows a rectangular 4-QAM constellation that employs Gray coding to assign bits to constellation points. Each constellation point could be viewed as representing two BPSK symbols on respective carrier signals that are 90° out of phase. An error in detecting one BPSK symbol, i.e., a decision error on the x- or y-axis boundary, is independent of any decision on the other boundary. Thus equation (7) still applies for optimizing the bit and gain allocations.

Let $\theta_n$ represent the angle between the constellation signal points and the x-axis in the nth frequency bin. In traditional 4-QAM, $\theta_n = \pi/4$, causing the component BPSK signals to have equal powers. However, because the optimal allocation method involves unequal protection for bits of differing significance, the constellation angle is treated as one of the variables to be optimized. The joint source-channel coding in this case can be formulated as $$\min_{\substack{P_n \geq 0 \\ 0 \leq \theta_n \leq \pi/2}} D_{qam} = \sum_{n=1}^{N} \omega_{2n-1} Q\left(\sqrt{P_n G_n} \cos\theta_n\right) + \qquad (14)$$

$$\omega_{2n} Q\left(\sqrt{P_n G_n} \sin\theta_n\right)$$

$$\text{subject to } \sum_{n=1}^{N} P_n = P_t,$$

where $\omega_{2n-1}$ and $\omega_{2n}$ are the weighting coefficients of the first and second bits transmitted over the nth frequency bin. The energies of the constituent BPSK signals on the x- and y-axes are $P_n \cos^2 \theta_n$ and $P_n \sin^2 \theta_n$, respectively. Note that the decision boundaries employed by the receiver (i.e., the x- and y-axes) are fixed and independent of the chosen constellation angle.

It can be proven that employing optimized 4-QAM constellations over frequency bins as described above, always results in superior performance compared to BPSK. The foregoing joint source-channel coding framework also allows for analysis of higher order modulations to further optimize the system performance.

Figure 9:
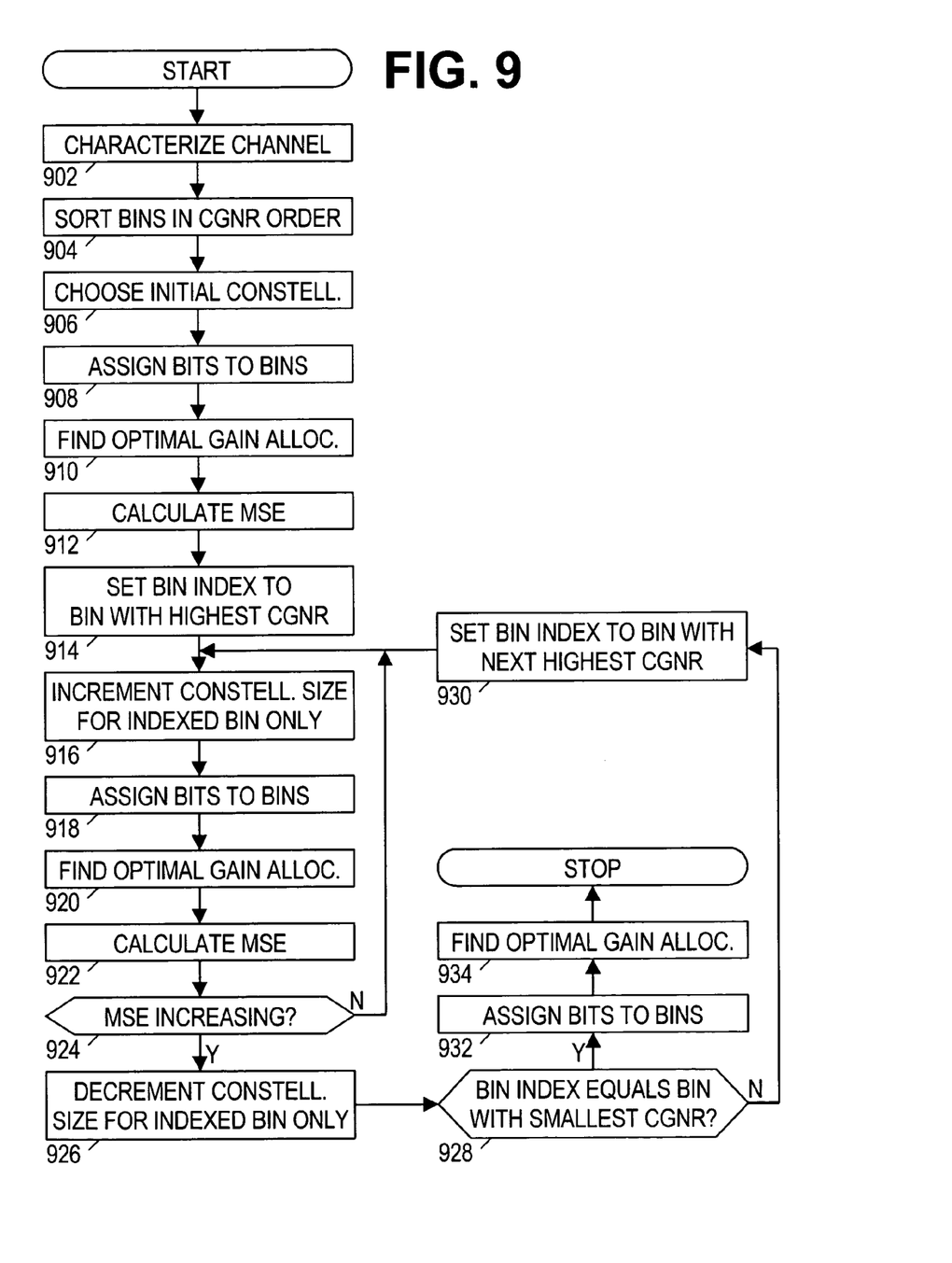

FIG. 9 shows a flowchart of an illustrative method for optimizing system performance with higher-order modulation. Beginning in block 902, the channel is characterized to determine the CGNR for each frequency bin. In block 904, the bins are sorted in decreasing gain order so that the nth bin has the nth highest CGNR. In block 906, an initial constellation (e.g., 4-QAM, since the performance of 4-QAM is always better than BPSK) is chosen, and the corresponding number of bits per bin is determined. In block 908, the bits are sorted in decreasing weight order (so that the nth bit has the nth highest importance) and the bits are assigned to bins so as to send more significant bits via bins with higher CGNRs. In block 910, the optimal power allocation is determined by solving a convex optimization problem, and in block 912, the resulting mean-squared error (MSE) is calculated. Thereafter, successive MSE computations will be compared with a preceding MSE, and the minimum MSE will be identified when the MSEs start increasing.

Block 914 initializes a loop index for an "outer" loop formed by blocks 916-930. The loop index is iterated through each of the bin numbers in order from the bin having the highest CGNR to the bin having the lowest CGNR. The outer loop includes an "inner" loop formed by blocks 916-924. In block 916, the constellation size is incremented for the currently indexed bin, e.g., going from $2^n$ to $2^{n+1}$ signal points, and the number of bits for the current bin is thereby determined. In block 918, the bits are sorted by importance and assigned to bins in CGNR order. In block 920, the optimal gain allocation is determined (again, a convex optimization problem, solvable by standard techniques), and in block 922, the resulting MSE is calculated. In block 924, the current MSE is compare to the preceding MSE to determine whether the MSE is increasing. If not, the inner loop is repeated with a higher-order modulation.

When an increase in MSE is detected in block 924, the inner loop ends and in block 926 the constellation size for the current bin is decremented once (back to the constellation size that provided the minimum MSE so far). In block 928, a test is made to determine whether the loop index has reached the bin having the smallest CGNR, and if not, the loop index is decremented in block 930. The outer loop is repeated until the loop index reaches the bin having the smallest CGNR. At that point, the appropriate constellation sizes have been determined for each bin, and in block 932, the bits are assigned to bins so as to send more significant bits via bins with higher CGNRs, and the method concludes in block 934 with another determination of the optimal power allocation.

Figure 6:
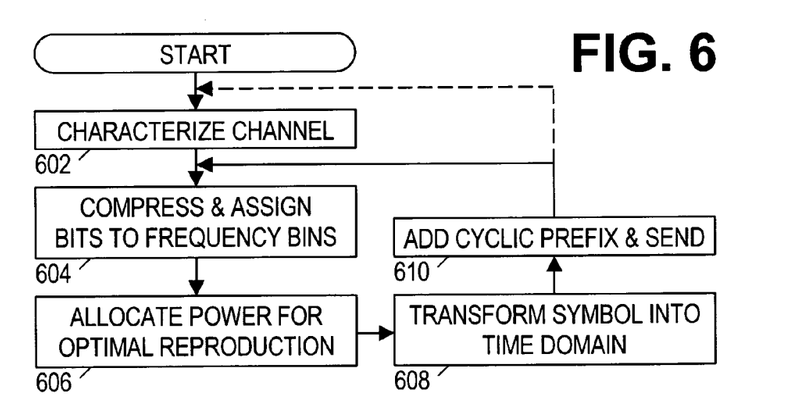
FIG. 6 is a flow diagram of an illustrative optimal MCM communication method.

FIG. 6 shows an optimal MCM transmission method. In block 602, the channel is characterized to estimate the CGNR. The characterization may be performed at the receiving end by measuring the channel noise spectrum during an interval of transmit silence, measuring a signal-plus-noise spectrum when the transmitter sends a known signal, and calculating the CGNR from these two measurements. Once the CGNR has been determined, bits are allocated to frequency bins using one of the methods described above. This allocation may be performed by either the transmitting end or the receiving end, and thereafter may be communicated to the other end of the channel so that both ends are aware of the bit allocation. The allocation of bits is performed in a manner that assigns the bits in order of importance to the bins in order of CGNR, the most important bits being assigned to the bins having the highest CGNR. The number of bits assigned to each bin is one for BPSK modulation, two for 4-QAM modulation, and more for higher-order modulations. Once the bit allocation has been determined, a power gain is allocated to each bit by solving equations (12) or (14), (or a linear approximation thereof). This too can be determined at either end of the communications channel, but for BPSK and 4-QAM, only the transmitter needs this information.

In block 604, module 510 maps the bits to frequency bins in accordance with the now-determined bit allocation. In block 606, module 510 applies the allocated gains to the bits to create a set of frequency coefficients for one MCM symbol. In block 608, the frequency coefficients are transformed into a time-domain MCM symbol, and in block 610 the MCM symbol is provided with a cyclic prefix and transmitted via the channel. Returning to block 604, the next symbol is then formed and transmitted, but periodically control returns to block 602 where the channel is re-characterized and the bit and gain allocations are re-determined to accommodate changes in the channel characteristics. In some embodiments, the bit and gain allocation may be adapted based on measured error margins or error rates.

Figure 8:
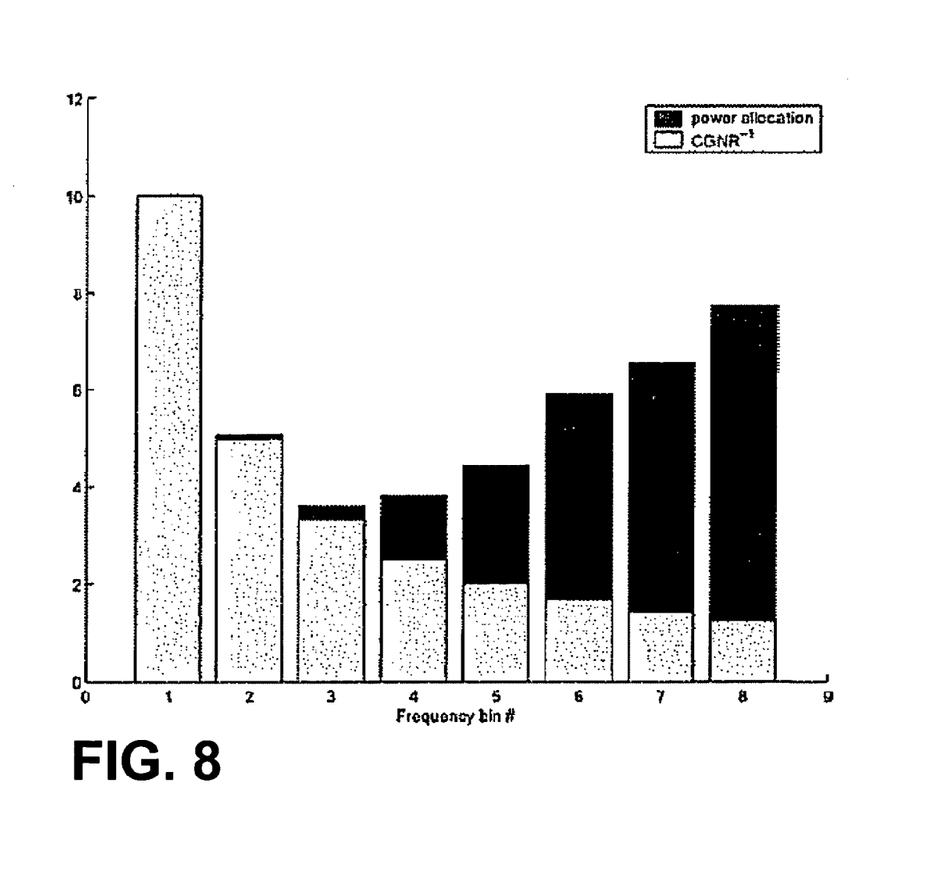
FIG. 8 is a graph of an illustrative power allocation.

FIG. 8 shows an illustrative optimal power allocation for an eight-bin channel carrying two telemetry signals using BPSK MCM. The light-colored bars show the inverse CGNR, so bin 8 is the one having the best CGNR. The dark-colored bars show the optimal power allocation for each bin. Notice that bin 8, which has been assigned the most important bit, is also allocated the largest fraction of the available power. No power is allocated to bin 1, so the corresponding bit is essentially dropped.

The approaches disclosed herein provide an optimal MWD communication system that explicitly minimizes the overall distortion in reconstructing the telemetry signals from the received bits. We have considered the mean-squared error between the original and the reconstructed signals as the distortion measure. Fidelity requirements of the individual telemetry signals are balanced by using weighting coefficients of the individual distortions, with higher-weights assigned to the more important signals. The design criterion is a minimized weighted sum of signal distortions under the channel, noise, and transmit power constraints.

Because the mean-squared error distortion measure is used, the transmitted bits are not equally important. Some bits contribute more strongly to the mean-squared error. For example, an error in the most significant bit is far more destructive than an error in the least significant bit position. The foregoing analysis indicates that the optimal transmission strategy jointly optimizes the quantization of the telemetry signals at the output of the A/D converters (by optimally selecting the bits to be transmitted), while unequally protecting the individual bits against communication errors.

Though described in the context of acoustic MWD telemetry, the disclosed methods are applicable to other forms of telemetry, including wireline telemetry and electromagnetic telemetry. Furthermore, the disclosed methods are described as using BPSK and 4-QAM constellations, but the same methods may be applied to larger constellation sizes. Repeaters may be included along the drill string to extend the signaling range. It is also noted that the disclosed acoustic telemetry system may operate through continuous (coiled) tubing as well as threaded tubing, and can be employed for both MWD and LWD systems, as well as for production logging using permanently installed sensors, smart-wells, and drill stem testing.

Numerous variations and modifications will become apparent to those skilled in the art once the above disclosure is fully appreciated. For example, the foregoing description was made in the context of a drilling operation, but such acoustic telemetry may also take place through production tubing or any other length of acoustically transmissive material inside or outside of a borehole. It is intended that the following claims be interpreted to embrace all such variations and modifications.

What is claimed is:

1. A telemetry method that comprises:
   characterizing a communications channel to estimate channel gain to noise ratio (CGNR) as a function of frequency bin;
   determining multicarrier modulation parameters that minimize distortion of one or more telemetry signals, wherein the multicarrier modulation parameters include a number of quantization bits for the one or more telemetry signals, and wherein said minimization is made subject to the CGNR and a transmit power limit;
   generating a communications signal using said multicarrier modulation parameters; and
   transmitting the communications signal via the communications channel.

2. The method of claim 1, wherein said minimization is further made subject to predetermined fidelity requirements for multiple telemetry signals.

3. The method of claim 1, wherein said determining multicarrier modulation parameters includes:
   assigning telemetry signal bits to frequency bins, wherein said assigning allocates more influential bits to frequency bins having higher CGNRs.

4. The method of claim 3, wherein said determining multicarrier modulation parameters further includes:
   determining a gain for each of the frequency bins.

5. The method of claim 4, wherein said assigning telemetry signal bits and said determining a gain result in a determination of an optimal bit resolution for each of multiple telemetry signals.

6. The method of claim 4, wherein said determining multicarrier modulation parameters further includes:
   optimizing constellation signal sets to support unequal error protection for bits of different significance.

7. The method of claim 6, wherein said optimizing includes determining a 4-QAM phase angle.

8. The method of claim 7, further comprising:
   receiving the communications signal with a receiver having decision boundaries that are fixed and independent of frequency bin gains and 4-QAM phase angles.

9. The method of claim 2, wherein said determining multicarrier modulation parameters includes:
   allocating a fixed number of bits to each frequency bin, wherein said allocating includes:
      determining a weight for each bit from the fidelity requirements and from the bit's significance in a binary representation of a signal value;
      ordering the bits by weight;
      ordering frequency bins by CGNR value; and
      proceeding in order from highest weight to lowest and from highest CGNR to lowest, assigning bits to frequency bins in their respective orders.

10. The method of claim 4, wherein the communications channel comprises a drill string, and wherein the communications signal takes the form of acoustic waves traveling in a wall of the drill string.

11. The method of claim 4, wherein the communications channel comprises a wireline.

12. A downhole telemetry system that comprises:
    a telemetry transmitter that employs combined source-channel coding to generate an acoustic signal that represents at least one analog telemetry signal, wherein the combined-source channel coding includes determining, based on channel gain to noise ratio (CGNR), a number of quantization bits for the at least one analog telemetry signal;
    a tubular string coupled to the telemetry transmitter to transport the acoustic signal; and
    a telemetry receiver coupled to the tubular string to receive the acoustic signal and to convert the acoustic signal into a representation of the at least one analog telemetry signal.

13. The system of claim 12, wherein the combined source-channel coding minimizes distortion of the at least one analog telemetry signal subject to channel gain to noise ratio (CGNR) measurements and a transmit power limit.

14. The system of claim 12, wherein the telemetry transmitter assigns bits representing the at least one analog telemetry signal, in order from most influential to least influential, to channel frequency bins, in order from highest CGNR measurement to lowest CGNR measurement.

15. The system of claim 12, wherein the telemetry receiver is configured to use fixed decision boundaries that are independent of any gain allocations made by the telemetry transmitter.

* * * * *

UNITED STATES PATENT AND TRADEMARK OFFICE
CERTIFICATE OF CORRECTION

PATENT NO. : 7,265,682 B2 Page 1 of 1
APPLICATION NO. : 11/093120
DATED : September 4, 2007
INVENTOR(S) : Mahsa Memarzadeh

It is certified that error appears in the above-identified patent and that said Letters Patent is hereby corrected as shown below:

In column 7, line 66, "$k_m =_m$" should read --$k_m = I_m$--.

Col. 13, line 49;
In claim 8, line 3, "that arc fixed" should read --that are fixed--.

Signed and Sealed this

Eighteenth Day of December, 2007

JON W. DUDAS
*Director of the United States Patent and Trademark Office*